US011678137B2

United States Patent
Harvey et al.

(10) Patent No.: US 11,678,137 B2
(45) Date of Patent: Jun. 13, 2023

(54) DECENTRALIZED PROXIMITY SYSTEM WITH MULTIPLE RADIO LINKS

(71) Applicant: Fleetwood Group, Inc., Holland, MI (US)

(72) Inventors: Brian T. Harvey, Zeeland, MI (US); Jason T. Grant, Holland, MI (US); Travis Wilson, Zeeland, MI (US); Nicholas Hayhoe, Zeeland, MI (US); Warren Guthrie, West Olive, MI (US); Nicholas A. Schrock, Grand Rapids, MI (US); John G. Videtich, Zeeland, MI (US)

(73) Assignee: Fleetwood Group, Inc., Holland, MI (US)

( * ) Notice: Subject to any disclaimer, the term of this patent is extended or adjusted under 35 U.S.C. 154(b) by 44 days.

(21) Appl. No.: 17/307,101

(22) Filed: May 4, 2021

(65) Prior Publication Data

US 2021/0352434 A1 Nov. 11, 2021

Related U.S. Application Data

(60) Provisional application No. 63/033,879, filed on Jun. 3, 2020, provisional application No. 63/033,876, filed
(Continued)

(51) Int. Cl.
*H04W 4/02* (2018.01)
*H04W 8/00* (2009.01)
(Continued)

(52) U.S. Cl.
CPC .......... *H04W 4/023* (2013.01); *H04B 1/7163* (2013.01); *H04W 4/80* (2018.02);
(Continued)

(58) Field of Classification Search
CPC ....... H04W 4/023; H04W 4/80; H04W 8/005; H04W 76/11; H04W 84/18;
(Continued)

(56) References Cited

U.S. PATENT DOCUMENTS

| 6,317,436 B1 | 11/2001 | Young et al. |
| 7,260,362 B2 | 8/2007 | Teibel |

(Continued)

FOREIGN PATENT DOCUMENTS

| WO | 2005064824 A1 | 7/2005 |
| WO | 2010099488 A1 | 9/2010 |
| WO | 2016126280 A1 | 8/2016 |

OTHER PUBLICATIONS

International Search Report and Written Opinion of the International Searching Authority from corresponding Patent Cooperation Treaty (PCT) Application No. PCT/IB2021/053742, indicated completed on Aug. 7, 2021.

*Primary Examiner* — Hirdepal Singh
(74) *Attorney, Agent, or Firm* — Gardner, Linn, Burkhart & Ondersma LLP

(57) ABSTRACT

A contact and ranging system includes a first device that includes a first transceiver, a second transceiver, and a controller to control the first transceiver and the second transceiver of the first device. The first device is operable to determine a distance between the first device and a second device. The first transceiver is configured to perform a discovery operation. Other devices are discovered and added to a list of paired devices. A ranging schedule for each paired device in the list of paired devices is determined. The second transceiver is configured to perform a ranging operation. The ranging and response transmissions are transmitted and received by a pair of devices, such that a range between the pair of devices is determined based upon a time of flight
(Continued)

between the pair of devices. The range between the pair of devices is matched with a timestamp and stored in a database.

36 Claims, 15 Drawing Sheets

Related U.S. Application Data on Jun. 3, 2020, provisional application No. 63/020,861, filed on May 6, 2020.

(51) Int. Cl.
    *H04W 4/80*           (2018.01)
    *H04B 1/7163*        (2011.01)
    *H04W 76/11*        (2018.01)
    *G01B 7/14*          (2006.01)

(52) U.S. Cl.
    CPC ............ *H04W 8/005* (2013.01); *H04W 76/11* (2018.02); *G01B 7/14* (2013.01)

(58) Field of Classification Search
    CPC .............. H04W 52/0216; H04W 76/14; H04B 1/7163; H04B 2201/71346; H04B 2201/71634; H04B 1/713; G01B 7/14; Y02D 30/70; G01S 13/765
    USPC ...................................... 455/456.1
    See application file for complete search history.

(56) References Cited

U.S. PATENT DOCUMENTS

| | | | |
|---|---|---|---|
| 7,647,022 | B2 | 1/2010 | Ng et al. |
| 7,787,437 | B2 | 8/2010 | Sakoda |
| 8,064,374 | B2 | 11/2011 | Kakani et al. |
| 8,391,257 | B2 | 3/2013 | Sakoda |
| 8,405,503 | B2 | 3/2013 | Wong |
| 8,533,507 | B2 | 9/2013 | Vandwalle et al. |
| 8,780,869 | B2 | 7/2014 | Bracha |
| 8,811,199 | B2 | 8/2014 | Nixon et al. |
| 9,077,564 | B2 | 7/2015 | Jabara et al. |
| 9,091,746 | B2 | 7/2015 | Fischer et al. |
| 9,119,020 | B2 | 8/2015 | Lambert |
| 9,161,232 | B2 | 10/2015 | Linsky et al. |
| 9,198,119 | B2 | 11/2015 | Venatraman et al. |
| 9,265,044 | B2 | 2/2016 | Sakoda |
| 9,408,136 | B2 | 8/2016 | Venkatraman et al. |
| 9,736,778 | B2 | 8/2017 | Amizur et al. |
| 9,843,935 | B2 | 12/2017 | Sakoda |
| 10,182,088 | B2 | 1/2019 | Jose et al. |
| 10,198,779 | B2 | 2/2019 | Pittman et al. |
| 10,342,013 | B2 | 7/2019 | Yong et al. |
| 10,412,659 | B2 | 9/2019 | Wang |
| 10,681,759 | B2 | 6/2020 | Liu et al. |
| 10,803,993 | B2 | 10/2020 | Huang |
| 2010/0201573 | A1* | 8/2010 | Lamming ............ G01S 5/0289 342/451 |
| 2012/0268269 | A1 | 10/2012 | Doyle |
| 2013/0109406 | A1* | 5/2013 | Meador .................. H04W 4/33 455/456.1 |
| 2014/0035526 | A1 | 2/2014 | Tripathi et al. |
| 2014/0155098 | A1 | 6/2014 | Markham et al. |
| 2014/0236611 | A1 | 8/2014 | Ribble et al. |
| 2014/0266907 | A1 | 9/2014 | Taylor, Jr. et al. |
| 2017/0206334 | A1 | 7/2017 | Huang |
| 2018/0084398 | A1 | 3/2018 | Xiong et al. |
| 2018/0146401 | A1 | 5/2018 | Fujishiro et al. |
| 2019/0101612 | A1 | 4/2019 | Hsiao |
| 2020/0150262 | A1 | 5/2020 | Kim et al. |
| 2020/0178005 | A1 | 6/2020 | Longaa |
| 2021/0233197 | A1* | 7/2021 | John .................. G01S 13/0209 |
| 2021/0392454 | A1* | 12/2021 | Choi ...................... H04W 4/40 |

* cited by examiner

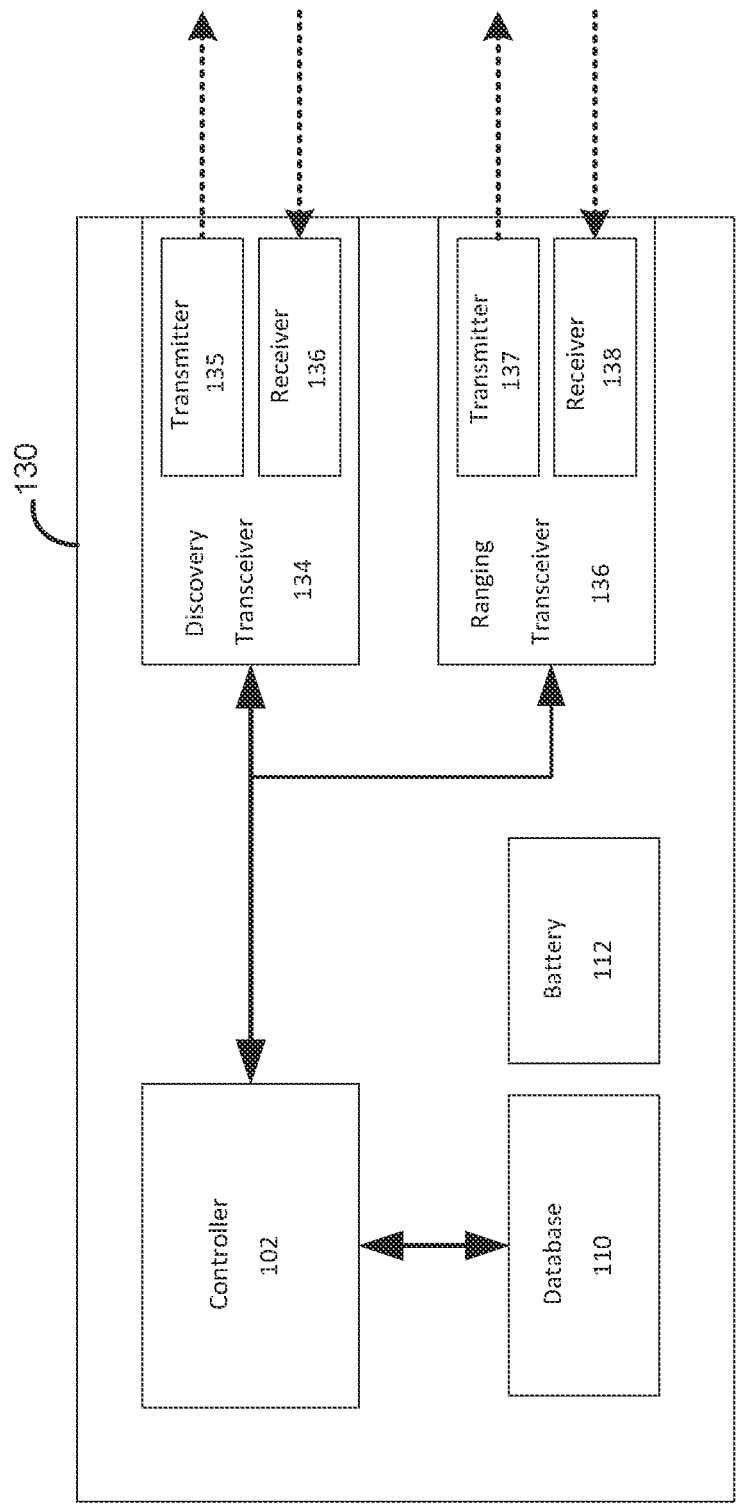

10

10

10

10

DECENTRALIZED PROXIMITY SYSTEM WITH MULTIPLE RADIO LINKS

CROSS REFERENCE TO RELATED APPLICATIONS

This application claims the filing benefits of U.S. provisional applications, Ser. No. 63/020,861, filed May 6, 2020; Ser. No. 63/033,876, filed Jun. 3, 2020; and Ser. No. 63/033,879, filed Jun. 3, 2020, which are hereby incorporated herein by reference in their entireties.

FIELD OF THE INVENTION

The present invention is directed to positioning/ranging systems, and in particular to decentralized positioning/ranging systems.

BACKGROUND OF THE INVENTION

Conventional positioning and/or ranging systems, such as the global positioning system (GPS), or other wireless positioning systems (e.g., Wi-Fi and Bluetooth), may be used for location services that receive and process signals transmitted from orbiting satellites or fixed location wireless beacons, respectively. However, such positioning systems (i.e., GPS and Wi-Fi) are unsuitable for ranging between mobile radios as their range accuracy is limited (e.g., 5-20 meters). While Bluetooth-based wireless systems can be used to determine a range or location of devices carrying Bluetooth wireless radios, Bluetooth-based location systems may require the use of Bluetooth wireless receivers to detect and track the positions of those other Bluetooth radios. Furthermore, Bluetooth-based wireless location and positioning has a range accuracy of 1-5 meters.

Conventional wireless systems capable of providing positioning and ranging include GPS, Wi-Fi, and Bluetooth systems. As discussed herein, GPS and Wi-Fi systems provide positioning and ranging data (with a range resolution of 5-20 meters), but require the use of one or more fixed, stationary beacon stations. Typically, mobile wireless devices are configured to receive radio signals transmitted by the fixed beacons. The mobile wireless devices are able to determine their respective locations based upon the radio signals received from the fixed beacons. An alternative conventional system used for positioning and ranging operations is a Bluetooth-based wireless system. Bluetooth-based wireless systems have a ranging accuracy of about a meter. While Bluetooth-based wireless systems, where a first individual carries a first Bluetooth radio and a second individual carries a second Bluetooth radio, is able to determine a device-to-device distance between the first and second Bluetooth radios without the use of stationary beacons, the ranging is limited to a meter of accuracy. In other words, Bluetooth-based ranging systems may be able to indicate that a particular Bluetooth radio is in the general area of another Bluetooth radio, but not any closer. There are also ultra-wideband (UWB) radio systems configured to provide positioning and ranging operations that are accurate to within centimeters, however, these UWB radio solutions require the use of UWB receivers that are continuously receiving. Due to their resultant energy demands, these UWB receivers are stationary and connected to a constant source of power. These UWB receivers are mapped out in 3D and 2D, such that mobile UWB radio units are able to move among the UWB radio receivers and receive a location with respect to the stationary UWB receivers.

SUMMARY OF THE INVENTION

Embodiments of the present invention provide methods and a system for determining a device-to-device range of at least one other device within range of a first device. In an aspect of the present invention, a contact and ranging system includes a first device that includes a first transceiver configured for discovery mode operation, a second transceiver configured for ranging mode operation, and a controller operable to control the operation of the first transceiver and the second transceiver. The first device is operable to determine a distance between the first device and a second device.

The first transceiver is configured to perform a discovery operation wherein other devices are discovered and added to a list of paired devices. A ranging schedule for each paired device in the list of paired devices is determined.

The second transceiver is configured to perform a ranging operation where ranging and response transmissions are transmitted and received, such that a range between the pair of devices is determined based upon a time of flight between the pair of devices. The range between the pair of devices is matched with a timestamp and stored in a device database.

In another aspect of the present invention, a method for performing a contact and ranging operation between pairs of devices includes periodically placing a first transceiver of a first device in a discovery mode of operation. The first transceiver transmits a beacon signal during the discovery mode and the first transceiver alternatively listens for a beacon signal transmitted by another device. The first device is linked to the another device when a beacon signal is received from the another device or the beacon signal transmitted by the first transceiver is received by the another device. A corresponding user ID of the another device and a ranging schedule is stored in a database of the first device. A second transceiver of the first device is periodically placed in a ranging mode of operation. The second transceiver transmits a ranging radio signal during the ranging mode and the second transceiver alternatively listens for a ranging signal from a second device. Lastly, the method includes determining a device-to-device range between the first device and the second device. The device-to-device range is based upon an elapsed time for one of the first and second devices to transmit a ranging radio signal to be received by the other of the first and second devices and for the other of the first and second devices to transmit a response transmission back to the one of the first and second devices.

In an aspect of the present invention, the first transceiver includes a low-power transmitter/receiver. In another aspect of the present invention, the first transceiver is a Bluetooth wireless transceiver. The Bluetooth wireless transceiver may optionally operate in a Bluetooth Low Energy (BLE) mode.

In a further aspect of the present invention, the second transceiver includes a UWB transmitter/receiver which is configured to provide the device-to-device range with centimeter accuracy.

In yet a further aspect of the present invention, the second transceiver includes a magnetic field transmitter/receiver which is configured to provide the device-to-device range with centimeter accuracy. The magnetic field transmitter is configured to generate a magnetic field with a predetermined magnetic field strength. The magnetic field receiver is configured to detect and measure a magnetic field strength of a magnetic field generated by the second device. The device-to-device range between the first device and the second device is based upon the measured field strength of the magnetic field generated by either the first device or the second device.

In yet another aspect of the present invention, the device-to-device distance, along with a corresponding timestamp, are stored in a database of the first device.

In another aspect of the present invention, a device scanner and centralized database are provided. The first device is communicatively coupled to the device scanner and the user IDs and ranging data stored in the first device's database are transferred to the centralized database. A contact tracing diagram may be defined by an accumulated quantity of time that the second device was within a threshold distance from the first device. The accumulated quantity of time is based upon the stored timestamps connected with each distance measurement.

These and other objects, advantages, purposes and features of the present invention will become apparent upon review of the following specification in conjunction with the drawings.

BRIEF DESCRIPTION OF THE DRAWINGS

FIG. 1C is a block diagram of another alternative wireless device in accordance with the present invention;

DESCRIPTION OF THE PREFERRED EMBODIMENTS

The present invention will now be described with reference to the accompanying figures, wherein numbered elements in the following written description correspond to like-numbered elements in the figures. Methods and systems of the present invention may be used to provide for a process for discovering nearby wireless devices (e.g., wearable tags or badges), pairing with discovered wireless devices, and periodically performing a device-to-device ranging operation with each of the paired wireless devices. Such discovery, pairing, and ranging operations of the wireless devices described herein allow for the "contact tracing" of persons wearing the wireless devices. Contact tracing is generally understood to be a process whereby persons (i.e., "contacts") are identified who have been exposed to a person carrying an infectious disease (e.g., tuberculous, sexually transmitted diseases, and bacterial and viral infections). Such identified contacts may then be medically treated as needed, with the end goal being the reduction of such diseases in a population. There are other uses for contact tracing (e.g., monitoring the dissemination of information among a population). The acquired pairing and ranging data for a particular wireless device may be stored in a database with a record of each of the other wireless devices that have been discovered and paired with a particular wireless device, as well as a record of the device-to-device ranging results for each of the paired wireless devices with respect to the particular wireless device. These records may be used to create a contact tracing database that records the identities of others that have been near a particular person, how close each of those people have been to a particular person, and how long the exposure was. Individual specific information may also be entered into the database and cross-referenced to each of the other people paired with the particular person. For example, specific information may be stored related to an individual's health (e.g., whether an individual has been exposed to or is known to have an infectious disease, or any other condition or criteria that is affected by an individual's contact with other people). A contact list for a user may then be built that lists the names of people (each wearing a particular wireless radio that has been paired with the user's wireless radio) who have been within a threshold distance from the user.

Figure 1A:
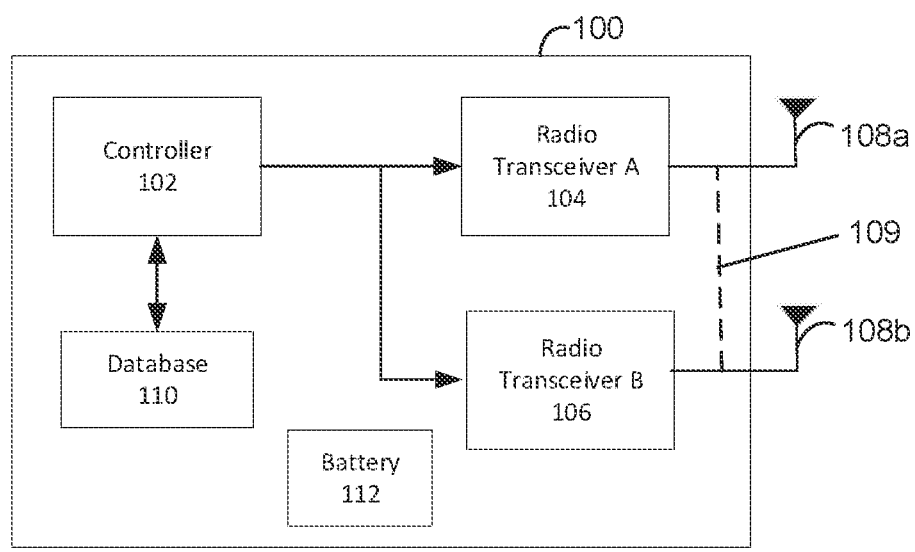
FIG. 1A is a block diagram of an exemplary wireless device in accordance with the present invention.

FIG. 1A illustrates an exemplary wireless device 100 of a contact and ranging system 10 of the present invention. The wireless device 100 (hereinafter "device") may be implemented as a wearable badge or tag that is worn by a user. The anticipated use of the contact and ranging system 10 of the present invention is for a group of people to each wear a separate, individually identified device 100 (see FIGS. 2A-2F). The device 100 includes a controller 102 that is communicatively coupled to a pair of radio transceivers: a radio transceiver A (hereinafter "discovery radio") 104 and a radio transceiver B (hereinafter "ranging radio") 106. The discovery 104 may be implemented as a Bluetooth-type wireless radio or other similar wireless radio systems. The ranging radio 106 may be implemented as an ultra-wideband (UWB) wireless radio or other similar wireless radio. Alternatively, the ranging radio 106 may be configured as a magnetic field transmitter/receiver, with a device-to-device range of centimeter accuracy.

Each radio transceiver 104, 106 is coupled to a respective antenna 108a,b. Optionally, the radio transceivers 104, 106 are coupled to a single antenna 106, with one of the radios 104, 106 coupled to the antenna 108 via an optional signal path 109.

Figure 1B:
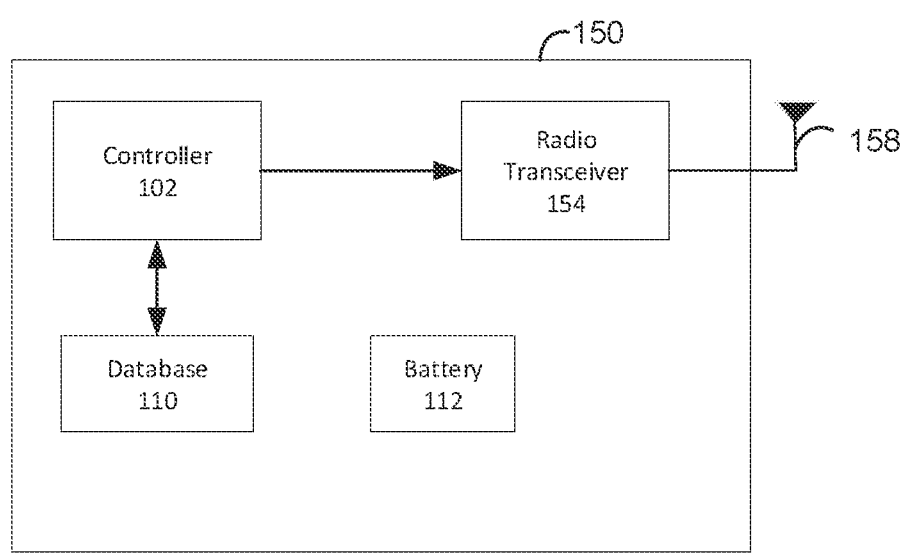
FIG. 1B is a block diagram of an alternative wireless device in accordance with the present invention.
Figure 1D:
FIG. 1D is a block diagram of a pair of wireless devices of FIG. 1C in accordance with the present invention.

FIG. 1B illustrates an alternative wireless device 150 of a contact and ranging system 10 of the present invention. While the wireless device 150 of FIG. 1B includes a controller 102, database 110, and battery 112, which are the same as in the wireless device 100 of FIG. 1A, the alternative wireless device 150 includes a dual-mode radio transceiver 154, which is coupled to an antenna 158. The dual-mode radio 154 is configured to operate in either a discovery mode or a ranging mode, as defined by the controller 102. When the dual-mode radio 154 is operating in the discovery mode, it is performing the functionality of the discovery radio 104 of the wireless device 100 of FIG. 1A. Similarly, when the dual-mode radio 154 is operating in the ranging mode, it is performing the functionality of the ranging radio 106 of the wireless device 100 of FIG. 1A. Thus, the dual-model radio 154 of FIG. 1B is configured to perform the functions of both the discovery radio 104 and the ranging radio 106. Thus, the following functionality of the discovery radio 104 and the ranging radio 106 of the wireless device 100, as described herein, may also be performed by the dual-mode radio transceiver 154.

The controller 102 of the wireless device 100 is operable to select one of the two radio transceivers 104, 106 to transmit and receive radio signals. The discovery radio 104 is configured to discover other devices 100 and to perform pairing operations with those other devices 100 (see FIGS. 2A-2F). The discovery radio 104 may include a low energy mode, such as found in the Bluetooth Low energy (BLE) mode. The BLE mode is configured to lower the energy requirements of devices 100 of the present invention. Optionally, the discovery and pairing operations may occur in BLE mode. The ranging radio 106 is configured to perform ranging operations of the paired devices 100. In an aspect of the present invention, the ranging radio 106 is configured to perform the ranging operations within a range accuracy of centimeters.

As discussed herein, the controller 102 is further operable to periodically activate the discovery radio 104 to perform the discovery and pairing operations, otherwise, the discovery radio 104 is sleeping and consuming minimal to no power. The controller is also operable to periodically activate the ranging radio 106 to perform the ranging operations, otherwise, the ranging radio 106 is sleeping and consuming minimal to no power.

The device 100 also includes a battery 112 that powers the device 100 for at least one period of time (e.g., a full day of wearing a badge or tag). The battery 112 may be a replaceable non-rechargeable battery or a rechargeable battery. Optionally the device 100 may include electrical contacts for recharging the battery 112.

The device 100 also includes a database 110 that stores the acquired pairing information and the determined ranging information. As discussed herein, the pairing information will include ranging operation scheduling. The database 110 of a first device 100a stores a device ID for each of the devices 100 paired to the first device 100a. The database 110 also stores ranging data for each of the paired devices, such that a range with respect to the first device 100a is stored for each of the paired devices. The database 110 may also include a calculated elapsed time that a paired device 100 was at a particular distance, or under a threshold distance from the first device 100a. The records stored in the database 110 may also include user specific information for selected devices 100.

Figure 2A:
FIGS. 2A-2F are block diagrams illustrating various pairing scenarios of wireless devices in accordance with the present invention.
Figure 2B:
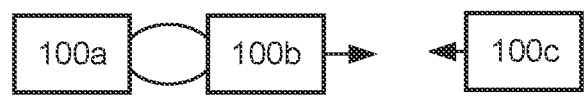
Figure 2C:
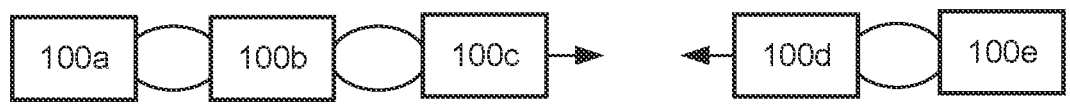
Figure 2D:
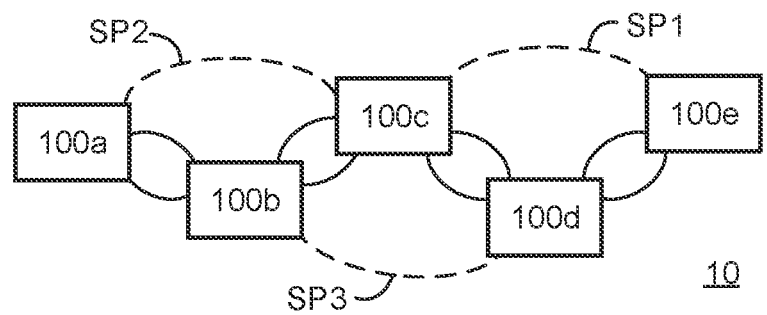
Figure 2E:
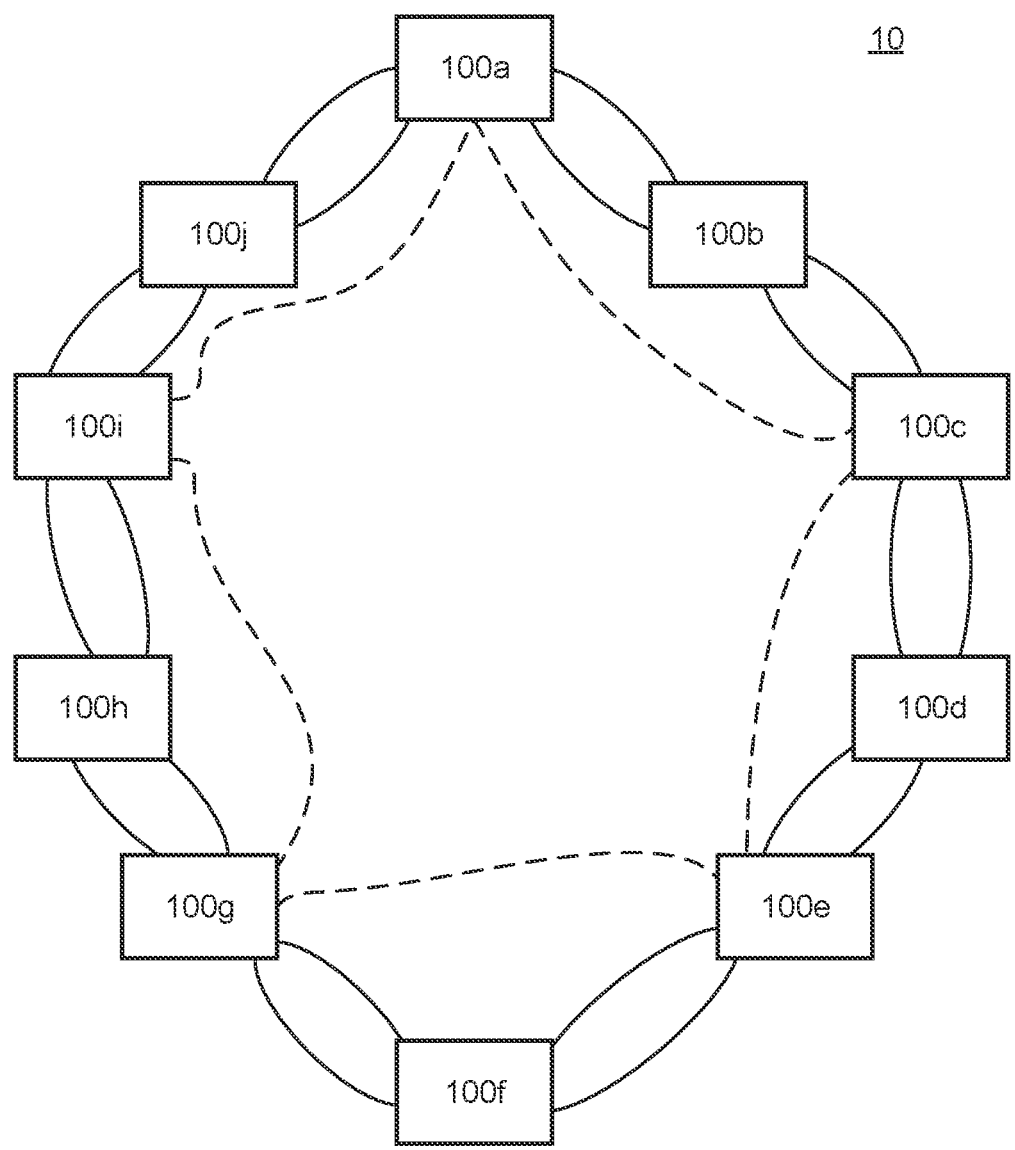
Figure 2F:
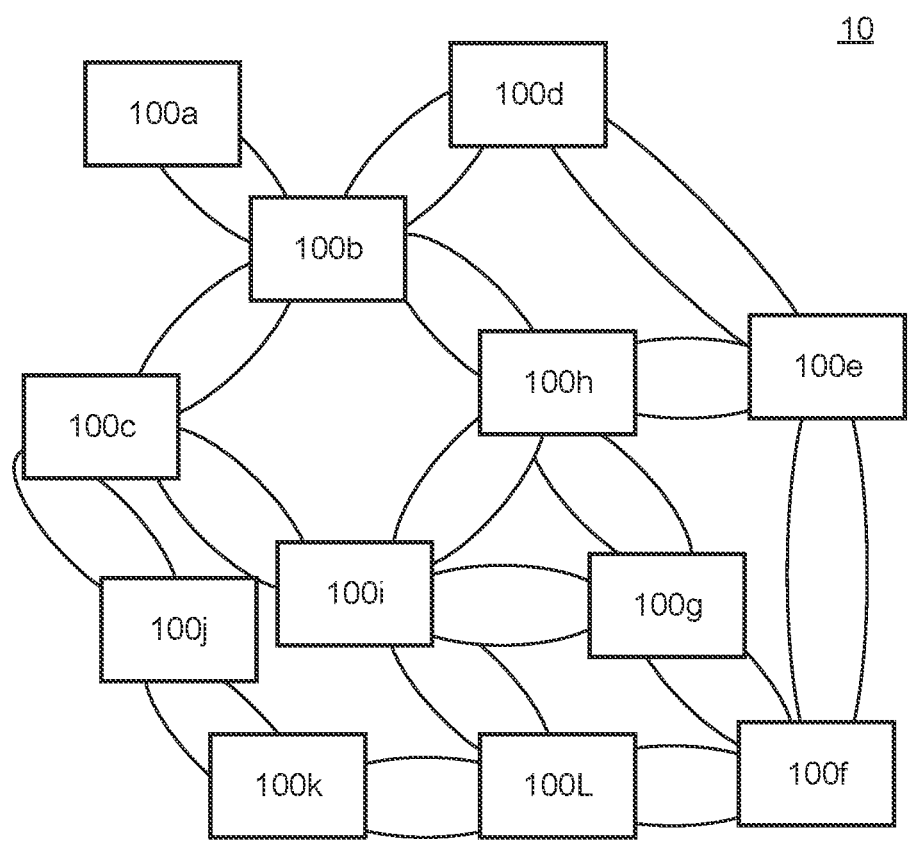

FIGS. 2A-2E illustrate a variety of pairing scenarios for the devices 100 of the contact and ranging system 10. FIG. 2A illustrates a first scenario where a first device 100a finds another device 100b. As discussed herein, such device finding or discover will take place utilizing the discovery radios 104 of the devices 100a,b. Once a pair of devices 100a,b discover each other and complete the process described herein, they are considered a "pair." FIG. 2B illustrates a second scenario where a third device 100c joins a group of N devices 100. In FIG. 2B, the group of N devices 100 is a group of two devices 100a,b that is joined by a third device 100c. In FIG. 2C, two groups of devices 100 come into range of each other. In FIG. 2C, a first group of three devices 100a,b,c is in pairing range of a second group of two devices 100d,e. Generically, the two groups of devices 100 may comprise any number of devices, such that group 1 comprises N devices 100 and group 2 comprises M devices 100. When Group 1 and Group 2 come into range of each other, they may form a daisy chain of devices 100. FIG. 2D illustrates an exemplary daisy chain of devices 100. FIG. 2D also illustrates that in addition to the linear wireless connection paths between devices (in a daisy chain), optional secondary wireless connection paths (SP1, SP2, SP3) are also possible. FIG. 2E illustrates a daisy chain of devices 100 forming a loop of devices 100a-j such that each device 100a-j in the loop has completed a connection path to two different devices in the loop. Optionally, the devices 100 in the loop may establish additional secondary wireless connection paths (indicated by the dotted lines in FIG. 2E) to other devices 100. FIG. 2F illustrates a scenario where there are too many devices 100 in range of each other. As discussed herein, in an aspect of the present invention, a maximum number of devices 100 contained in a loop or daisy chain is N=12. Each individual device 100 is able to pair with a maximum of 10 devices and to perform the ranging operations discussed herein with each of the other devices in the group (arranged as a daisy-chain or loop).

In an aspect of the present invention, a pairing of devices 100, such that those devices 100 periodically determine a device-to-device range between them, as well as exchange range information and user ID data, is accomplished without the need for any central timing coordination. Furthermore, to save power, each device's radios 104, 106 are powered down most of the time. As discussed herein, when a device's discovery radio 104 or ranging radio 106 is not transmitting or receiving, they are powered down by the controller 102.

Figure 3:
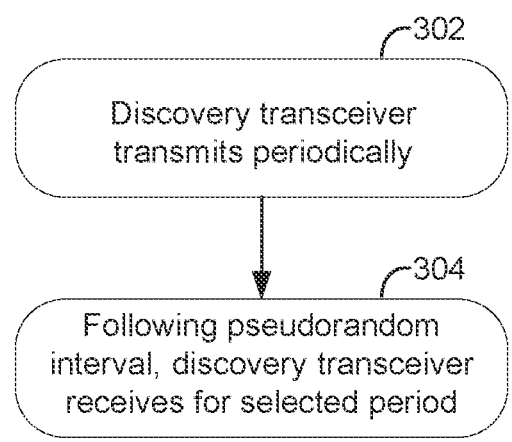
FIG. 3 is a flow diagram illustrating the steps to a proximity-based wireless device discovery process in accordance with the present invention.
Figure 10:
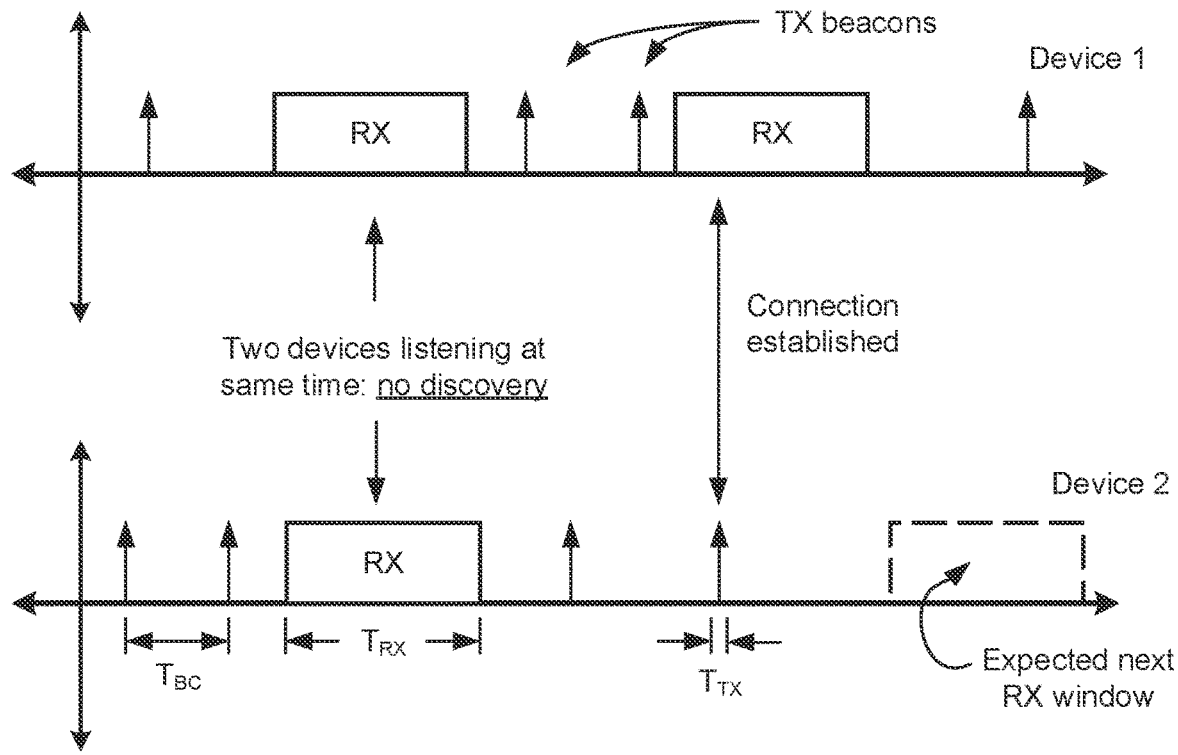
FIG. 10 is a timing diagram illustrating the transmit and receive coordination and timing during the discovery process of FIG. 2 in accordance with the present invention.

FIG. 3 illustrates the steps to the periodic discovery process. As discussed herein, the controller 102 of a device 100 coordinates the discovery radio 104 periodically transmitting a beacon signal and according to a pseudorandom timing scheme, listening for the beacon signals of other devices 100. The controller 102 performs the beaconing and listening according to a pseudorandom interval provided by a random number generator, which is seeded with a unique key, for example, a MAC address. In an aspect of the present invention, the discovery radio 104 of the device 100 will transmit and receive in BLE (Bluetooth low energy) mode. In step 302 of FIG. 3, a device 100 beacons (transmits) its discovery radio 104 periodically. This beacon will be a radio signal of a predetermined duration ($T_{TX}$). In step 304 of FIG. 3, the device 100 listens with its discovery radio 104 at a pseudorandom interval for the beacon signal of another device 100. For example, in the scenario illustrated in FIG. 2A, two devices 100a,b are each periodically beaconing and listening to detect each other's respective beacon signals. The coordination and timing for the periodic transmission of the beacon signal by the discovery radio 104 of a first device 100*a* and the pseudorandom interval of the discovery radio 104 of the first device 100*a* listening for beacon signals transmitted by a second device 100*b* is described in detail herein and illustrated in FIG. 10. FIG. 10 also illustrates an exemplary pairing connection (and the associated timings) between the first device 100*a* and the second device 100*b*.

Figure 4:
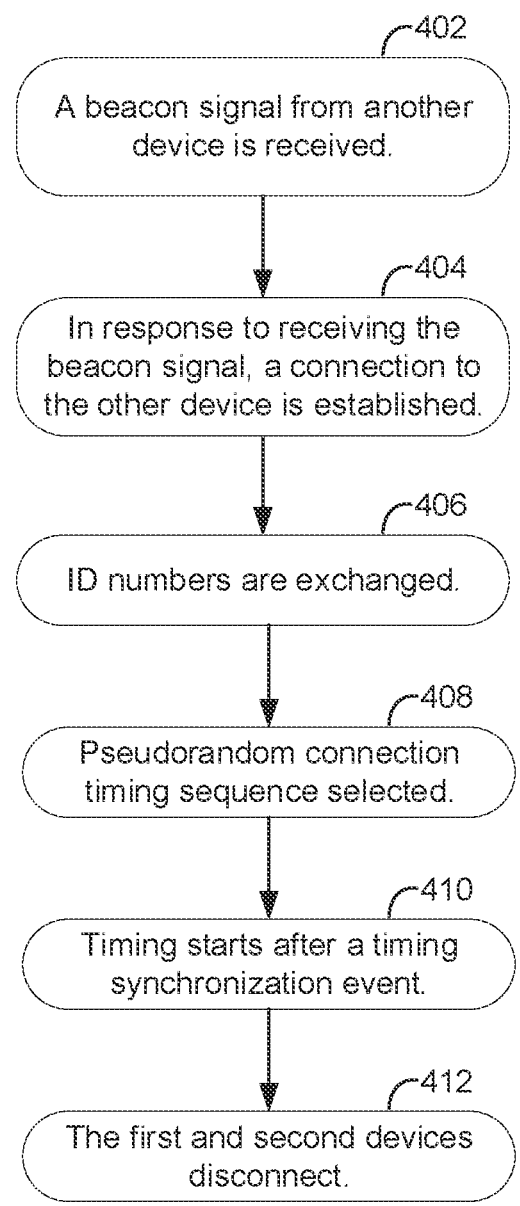
FIG. 4 is a flow diagram illustrating the steps to a connection process for pairing a first wireless device to a second wireless device in accordance with the present invention.

FIG. 4 illustrates the steps to a connection process for pairing a first device 100*a* to a second device 100*b*. FIG. 10 is a timing diagram illustrating the coordination and timing for the connection process. As discussed herein, the controller 102 (of each respective device 100) coordinates the discovery radio 104 and controls the pairing operation described herein. In step 402 of FIG. 4, a first device 100*a* receives a beacon signal from a second device 100*b*. In step 404 of FIG. 4, in response to receiving the beacon signal, a connection to the second device 100*b* is established. In step 406 of FIG. 4, upon connection between the first and second devices 100*a,b*, the devices 100*a,b* exchange unique ID numbers. In step 408 of FIG. 4, a pseudorandom connection timing sequence that is unique to this pair of devices 100*a,b* is established. In step 410 of FIG. 4, each device 100 starts timing upon a timing synchronization event using the discovery radio 104. In step 412 of FIG. 4, the two devices disconnect.

Figure 5:
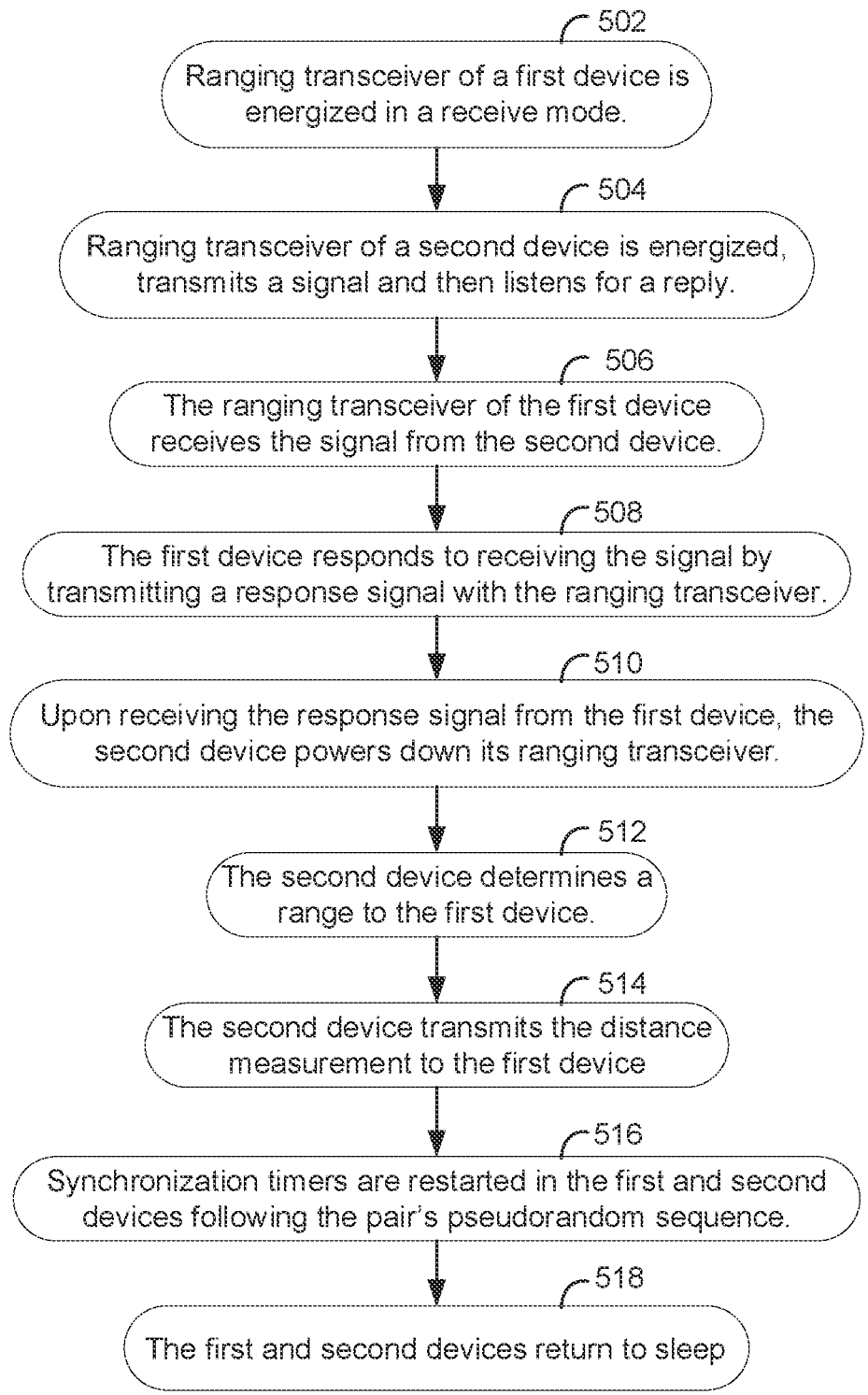
FIG. 5 is a flow diagram illustrating the steps to a ranging process for determining a device-to-device range for the first and second wireless devices of FIG. 3 in accordance with the present invention.
Figure 11:
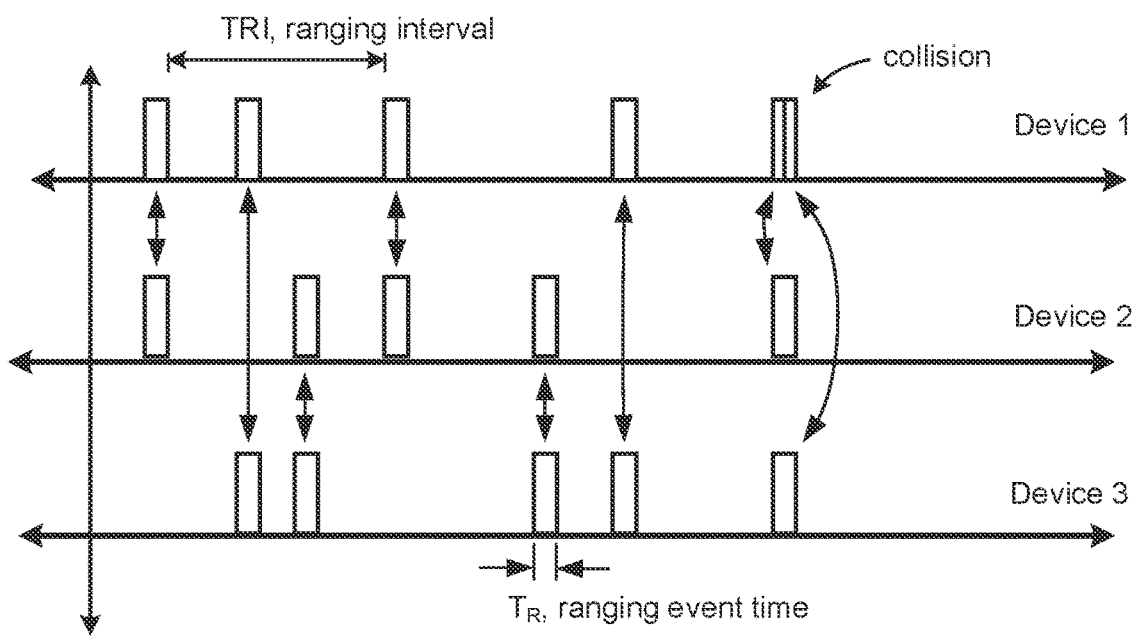
FIG. 11 is a timing diagram illustrating the timing and coordination requirements for performing the ranging operations of FIGS. 4, 7, and/or 9 in accordance with the present invention.

As discussed herein, each device 100 develops and maintains a list of up to N devices 100 that they are paired/linked with. In an aspect of the present invention, the maximum number of paired/linked devices 100 is 10. Other quantities of paired devices 100 are also possible. Each device 100 maintains a list of paired or linked devices 100, with a particular ranging timing pattern and a device ID recorded for each of them. The pairing list with ranging timing pattern and device ID are stored in the database FIG. 5 illustrates the steps performed during a ranging operation between devices 100. FIG. 11 is a timing diagram illustrating the timing and coordination for performing ranging operations between three devices 100*a,b,c*. According to the ranging timing pattern established, each pair of synchronized devices 100 will periodically wake up. Note that a first device 100*a* will wake up and perform a ranging operation with each other device 100*b-n* in its list of paired/linked devices 100 during the timeslot for each respective device 100*b-n*. In step 502 of FIG. 5, a designated side of the link (e.g., device 100*a*) will turn on its ranging radio 106 in a receive mode and listen. In step 504 of FIG. 5, the other side of the link (e.g., device 100*b*) will initiate a ranging exchange by energizing its wireless transceiver and transmitting a "ranging" radio signal and then listening for a reply transmission. In step 506 of FIG. 5, the first device 100*a* will receive the transmission from device 100*b*. In step 508 of FIG. 5, the first device 100*a* responds to receiving the transmitted signal from the second device 100*b* by transmitting a response or reply signal with its ranging radio 106. When the ranging radio 106 of the device 100*b* is transmitting, its receiver is disabled. In step 510 of FIG. 5, the second device 100*b* will receive the response signal and power down the ranging radio 106. In step 512 of FIG. 5, the second device 100*b* determines a device-to-device distance between the first device 100*a* and the second device 100*b*. In an aspect of the present invention, the second device 100*b* determines the distance according to a time-of-flight calculation based upon the speed of light. In step 514 of FIG. 5, the second device 100*b* transmits the device-to-device distance to the first device 100*a*. In an aspect of the present invention, the second device 100*b* utilizes either the discovery radio 104 or the ranging radio 106 to transmit the distance calculation. A timestamp for the ranging operation may also be used to indicate a start time and stop time for when the first device 100*a* is within a threshold distance from the second device 100*b*. Based upon the timestamps, the controller 102, or a controller in a centralized system, can determine an accumulated amount of time that the first device 100*a* has been within the threshold distance from the second device 100*b*. In step 516 of FIG. 5, the first and second devices 100*a,b* restart their synchronization timers following that pair's predetermined pseudorandom sequence. In step 518 of FIG. 5, each device 100*a,b* returns to sleep (i.e., their discovery radio 104 and their ranging radio 106 are powered down).

If a ranging attempt (between two devices 100*a,b*) is blocked by another ranging event, where one of the pair of devices 100*a,b* from the ranging attempt is already in the middle of a ranging event with a different device (e.g., device 100*c*). Each device 100 in the link will time out for that attempt and then retry at the next scheduled time in the predetermined pseudorandom sequence.

If the second device 100*b* is measured to be beyond a threshold distance from the first device 100*a* or has not had any successful ranging attempts for a particular duration of time, the second device 100*b* will be "forgotten" and removed from the list of linked or paired devices that are tracked and ranged by the first device 100*a*.

As discussed herein, a key factor in coordinating the ranging and discovery steps is the utilization of pseudorandom timing for both the ranging and discovery operations. For both discovery and ranging operations, one device 100 (e.g., a first device 100*a*) must be a beacon and transmitting with either its discovery radio 104 for discovery operations or with its ranging radio 106 for ranging operations, while the other device 100 (e.g., a second device 100*b*) needs to be receiving with either its discovery radio 104 for discovery operations or with its ranging radio 106 for ranging operations.

Figure 6:
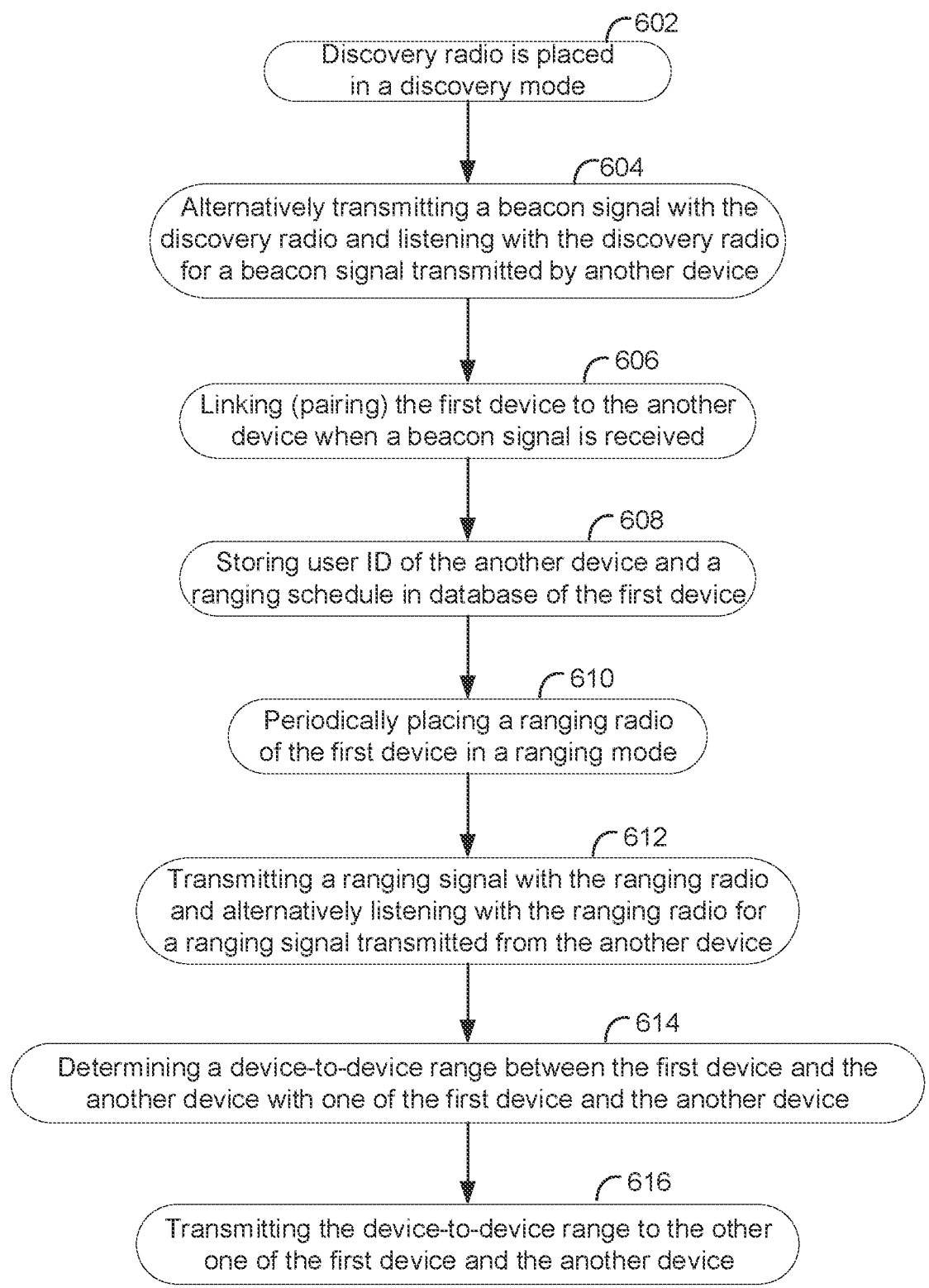
FIG. 6 is a flow diagram illustrating the steps to a pairing and ranging process for a pair of wireless devices in accordance with the present invention.

FIG. 6 illustrates exemplary steps to a discovery and ranging process. As discussed herein, the controller 102 coordinates the discovery transceiver 104 periodically transmitting a beacon signal and according to a pseudorandom timing scheme, listening for the beacon signals of other devices 100. In step 602 of FIG. 6, a first device 100 is placed into a discovery mode where it beacons (transmits) its discovery transceiver 104, 134 periodically. This beacon will be transmitted for a predetermined duration ($T_{TX}$). When the discovery transceiver 104, 134 is a radio signal transceiver, the beacon will be a radio frequency signal. When the discovery transceiver 134, illustrated in FIG. 1C, is an ultrasonic or infrared transceiver, the beacon will be an ultrasonic signal or an infrared signal, respectively. In step 604 of FIG. 6, the first device 100 listens with a discovery radio (e.g., its discovery transceiver 104) at a pseudorandom interval for the beacon transmitted by a second device 100. For example, in the scenario illustrated in FIG. 2A, two devices 100*a,b* are each periodically beaconing and listening to detect their respective beacon signals. The coordination and timing for the periodic transmission of the beacon signal by the discovery transceiver 104 of a first device 100*a*, as well as the pseudorandom interval of the discovery transceiver 104 of the first device 100*a* to listen for beacon signals transmitted by a second device 100*b* is described in detail herein and illustrated in FIG. 10. FIG. 10 also illustrates an exemplary pairing connection between the first device 100*a* and the second device 100*b*.

In step 606 of FIG. 6, in response to one of the first and second devices 100*a,b* receiving the beacon signal, a connection (i.e., linking or pairing) to the second device 100*b* by the first device 100a is established. In step 608 of FIG. 6, the user ID of the second device 100b, along with a ranging schedule for the second device 100b is stored in the database 110 of the first device 100a. In step 610 of FIG. 6, a ranging radio (e.g., the ranging transceiver 106) of the first device 100a is periodically placed in a ranging mode. A pseudorandom range timing sequence for the ranging mode is selected that is unique to this pair of devices 100a,b. According to the established ranging timing pattern, each pair of synchronized devices 100a,b will periodically wakeup for ranging operations. In step 612 of FIG. 6, a ranging signal is transmitted by the ranging radio (ranging transceiver 106) of the first device 100a, alternating with the ranging transceiver 106 listening for a ranging signal transmitted by the second device 100b. When the ranging transceiver 106, 136 illustrated in FIGS. 1A and 1C, respectively, is a radio signal transceiver, the ranging signal will be a radio frequency signal. When the ranging transceiver 136, illustrated in FIG. 1C, is an ultrasonic or infrared transceiver, the ranging signal will be an ultrasonic signal or an infrared signal, respectively.

In step 614 of FIG. 6, a device-to-device range is determined between the first device 100a and the second device 100b with one of the first device 100a and the second device 100b. In an exemplary exchange of ranging signals, while the first device 100a is in a receiving mode and listening, the second device 100b will transmit a ranging signal. After receiving the ranging signal, the first device 100a will respond by transmitting a response or reply signal with its ranging radio 106. The second device 100b will receive the response signal and determine a device-to-device distance between the first device 100a and the second device 100b. In an aspect of the present invention, the second device 100b determines the distance according to a time-of-flight calculation based upon the speed of light. In step 616 of FIG. 6, the first or second device 100a,b that determined the device-to-device range transmits the range to the other one of the first and second devices 100a,b. In an aspect of the present invention, the device 100 transmitting the device-to-device range value utilizes either the discovery transceiver 104 or the ranging transceiver 106 to transmit the device-to-device range. A timestamp for the ranging operation is also used to indicate a start time and a stop time for when the first device 100a is within a threshold distance from the second device 100b (based upon an accumulated quantity of proximity records and their respective timestamps). Based upon the timestamps, the controller 102 or a controller of a centralized system can determine an accumulated amount of time that the first device 100a has been within the threshold distance from the second device 100b.

Figure 7:
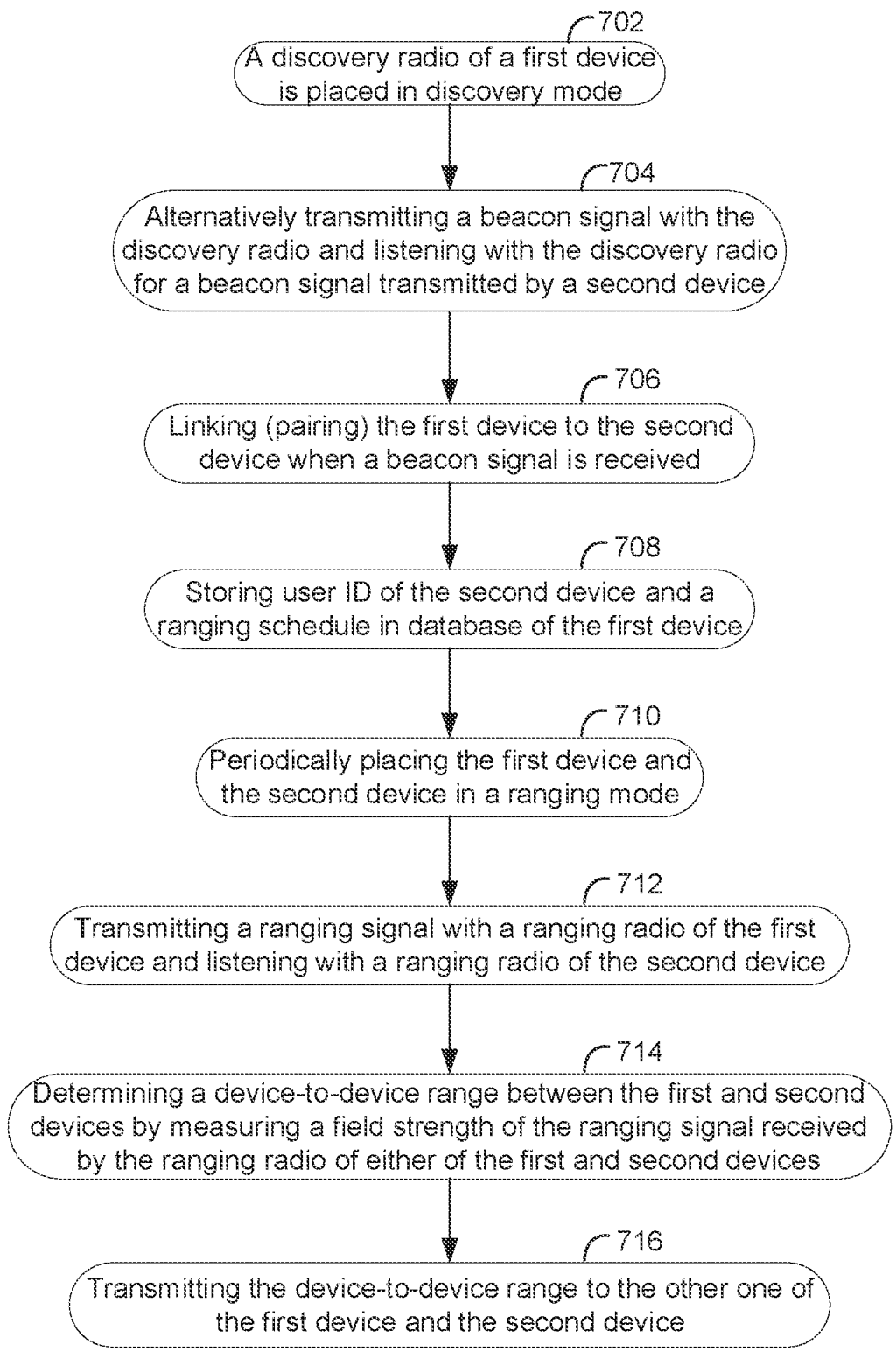
FIG. 7 is a flow diagram illustrating the steps to an alternate pairing and ranging process for a pair of wireless devices in accordance with the present invention.

FIG. 7 illustrates the steps to an alternative discovery and ranging process. In step 702 of FIG. 7, a first device 130, illustrated in FIG. 1C, beacons (transmits) its discovery radio (e.g., its discovery transceiver 134) periodically. This beacon will be transmitted for a predetermined duration ($T_{TX}$). When the discovery transceiver 134 is a radio signal transceiver, the beacon will be a radio frequency signal. When the discovery transceiver 134 of FIG. 1C is an ultrasonic or infrared transceiver, the beacon will be an ultrasonic signal or an infrared signal, respectively. In step 704 of FIG. 7, the first device 130 listens with its discovery transceiver 134 at a pseudorandom interval for the beacon transmitted by a second device 130. For example, in the scenario illustrated in FIG. 2A, two devices 100a,b (here replaced by the devices 130a,b of FIG. 1C) are each periodically beaconing and listening to detect each other's respective beacon signals. The coordination and timing for the periodic transmission of the beacon signal by the discovery transceiver 134 of a first device 130, as well as the pseudorandom interval of the discovery transceiver 134 of the first device 130 listening for beacon signals transmitted by a second device 130 is described in detail herein and illustrated in FIG. 10. FIG. 10 also illustrates an exemplary pairing connection between the first device 130 and the second device 130.

In step 706 of FIG. 7, in response to one of the first and second devices 130 receiving the beacon signal, a connection (i.e., pairing/linking) to the second device 130 by the first device 130 is established. In step 708 of FIG. 7, the user ID of the second device 130, along with a ranging schedule for the second device 130 is stored in the database 110 of the first device 130. In step 710 of FIG. 7, the ranging transceiver 136 of the first device 130 is periodically placed in a ranging mode. A pseudorandom range timing sequence for the ranging mode is selected that is unique to this pair of devices 130. According to the established ranging timing pattern, each pair of synchronized devices 130 will periodically wakeup for ranging operations. In step 712 of FIG. 7, a ranging signal is transmitted by the ranging transceiver 136 (the ranging radio) of the first device 130, alternating with the ranging transceiver 136 listening for a ranging signal transmitted by the second device 130. When the ranging transceiver 136, illustrated in FIG. 1C, is a radio signal transceiver, the ranging signal will be a radio frequency signal. When the ranging transceiver 136 is an ultrasonic or infrared transceiver, the ranging signal will be an ultrasonic signal or an infrared signal, respectively. Finally, when the ranging transceiver 136 is a magnetic field transceiver, the ranging signal will be a magnetic field generated by the ranging transceiver 136.

In step 714 of FIG. 7, a device-to-device range is determined between the first device 130 and the second device 130 with either the first device 130 or the second device 130. In an exemplary exchange of ranging signals (e.g., radio frequency signals, ultrasonic signals, and infrared signals), while the first device 130 is in a receiving mode and listening, the second device 130 will transmit a ranging signal. After receiving the ranging signal, the first device 130 will respond by transmitting a response or reply signal with its ranging radio 106. The second device 130 will receive the response signal and determine a device-to-device distance between the first device 130 and the second device 130. In an aspect of the present invention, the second device 130 determines the distance according to a measurement of a magnetic field strength. For example, a ranging transceiver 136 implemented as a magnetic field transceiver of the first device 130 measures the strength of the magnetic field generated by the second device 130. Based upon the measured strength of the magnetic field generated by the second device 130, the first device 130 determines a device-to-device range.

In step 716 of FIG. 7, the first or second device 130 that determined the device-to-device range transmits the range to the other one of the first and second devices 130. In an aspect of the present invention, the device 130 transmitting the device-to-device range utilizes its discovery transceiver 134 to transmit the device-to-device range. A timestamp for the ranging operation is also used to indicate a start time and a stop time for when the first device 130 is within a threshold distance from the second device 130 (based upon an accumulated quantity of proximity records and their respective timestamps). Based upon the timestamps, the controller 102 or a controller of a centralized system can determine an accumulated amount of time that the first device 130 has been within the threshold distance from the second device 130.

If a ranging attempt (between two devices 100a,b) is blocked by another ranging event, where one of the pair of devices 100a,b from the ranging attempt is already in the middle of a ranging event with a different device (e.g., device 100c), each device 100a,b in the link will time out for that attempt and then retry at the next scheduled time in the predetermined pseudorandom sequence. See FIGS. 10 and 11, discussed herein for further details on the timing and coordination of devices 100 during discovery/pairing and ranging operations.

If the second device 100b is measured to be beyond a threshold distance from the first device 100a or has not had any successful ranging attempts for a particular duration of time, the second device 100b will be "forgotten" and removed from the list of linked or paired devices that are tracked and ranged by the first device 100a.

As discussed herein, a key factor in coordinating the ranging and discovery steps is the utilization of pseudorandom timing for both the ranging and discovery operations. For both discovery and ranging operations, one device 100 (e.g., a first device 100a) must be a beacon and transmitting with either its discovery radio 104 for discovery operations or with its ranging radio 106 for ranging operations, while the other device 100 (e.g., a second device 100b) needs to be receiving with either its discovery transceiver 104 for discovery operations or with its ranging transceiver 106 for ranging operations.

Figure 8:
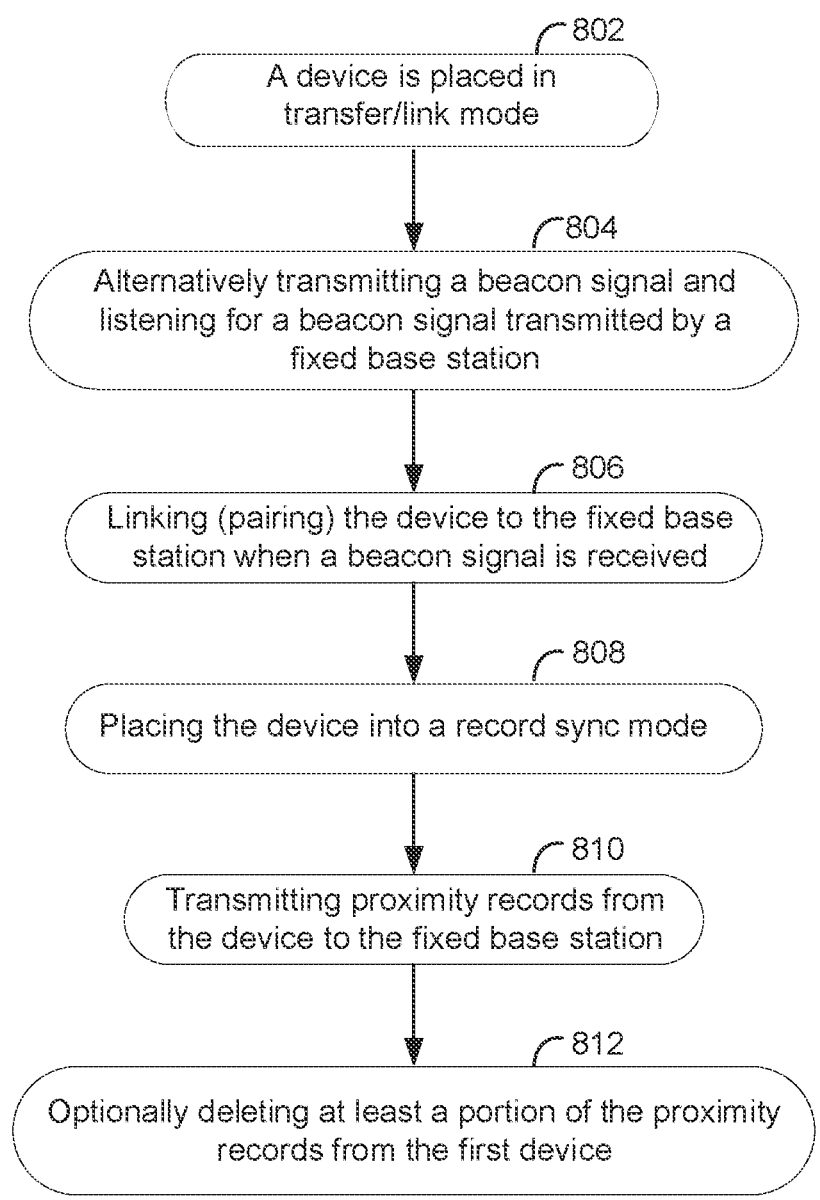
FIG. 8 is a flow diagram illustrating the steps to a linking and data transfer process for a first wireless device and a fixed base station in accordance with the present invention.
Figure 12:
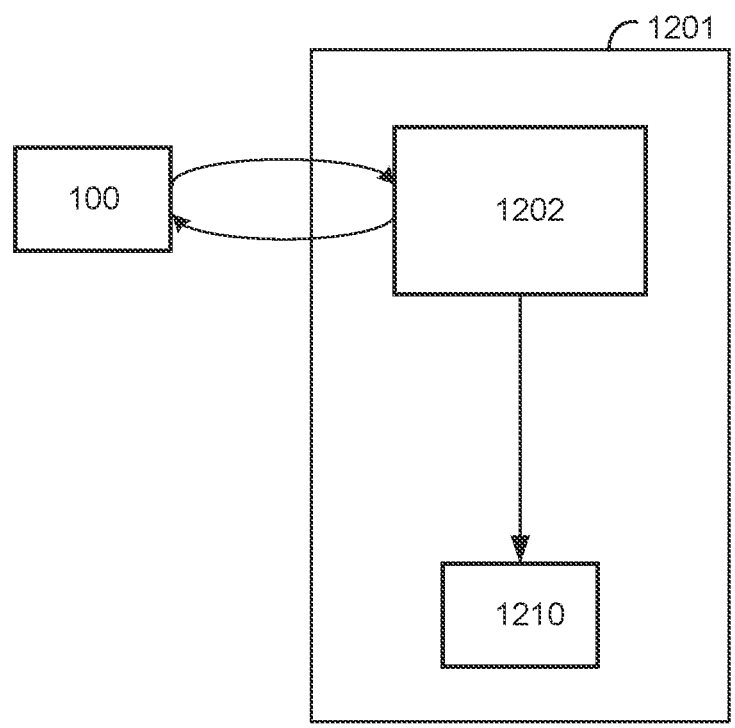
FIG. 12 is a block diagram of the device of FIG. 1 coupling to a device scanner communicatively coupled to a centralized database for storing transferred data in accordance with the present invention.

FIG. 8 illustrates the steps to a method for wirelessly pairing with and transferring data from a wireless device 100 to a fixed base station 1201 (see FIG. 12). In step 802 of FIG. 8, a device 100 is placed into a transfer/link mode. In an aspect of the present invention, the transfer/link mode is a discovery mode or similar mode for linking with and transferring data to a fixed base station 1201. In step 804 of FIG. 8, the device 100 alternatively transmits a beacon signal and listens for a beacon signal transmitted by the fixed base station 1201. In step 806 of FIG. 8, the device 100 is linked or paired with the fixed base station 1201 when a beacon signal is received. The steps for linking or pairing with the fixed base station 1201 may be equivalent to linking/pairing with another device 100 as discussed herein. In step 808 of FIG. 8, the device 100 and the fixed base station 1201 are placed in a proximity/range record synchronization mode such that in step 810 of FIG. 8, proximity records are transmitted from the device to the fixed base station 1201. In step 812 of FIG. 8, after the proximity records are transferred to the fixed base station 1201, a portion of the proximity records stored in the database 1210 of the device 100 are deleted. For example, proximity records older than a threshold timestamp are deleted. Optionally, after the proximity records are transferred to the fixed base station 1201, all of the proximity records are deleted from the device 100.

The server database 1210 may be configured to organize and store "contact tracing" reports for each individual (and their corresponding device 100 configured as a badge/tag). An exemplary contact tracing report may be specific to an individual's user ID and include a data range, the individual's name and user ID, and those other devices b-n that were within a selected threshold distance from the particular device 100a (e.g., within six (6) feet) during the selected data range. The contact tracing report may also indicate the duration of contact or an accumulated duration of contact. Such a contact tracing report would allow a report to be generated for a particular individual associated with device 100a and those individuals associated with the other devices 100b-n.

Figure 9:
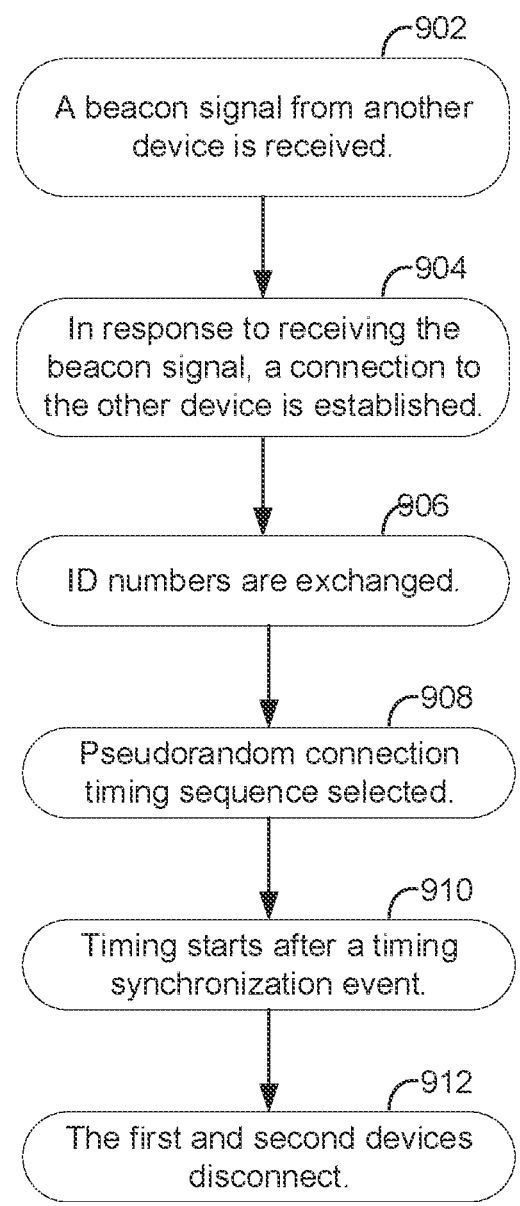
FIG. 9 is a flow diagram illustrating the steps to an alternative connection process for pairing a first wireless device to a second wireless device in accordance with the present invention.

FIG. 9 illustrates the steps to an alternative connection process for pairing a first device 100a to a second device 100b. FIG. 10 is a timing diagram illustrating the coordination and timing for the connection process. As discussed herein, the controller 102 of the device 100 coordinates the discovery transceiver 104 and controls the pairing operation described herein. In step 902 of FIG. 9, a first device 100a receives a beacon signal from a second device 100b. In step 904 of FIG. 9, in response to receiving the beacon signal, a connection to the second device 100b is established. In step 906 of FIG. 9, upon connection between the first and second devices 100a,b, the devices 100a,b exchange unique ID numbers. In step 908 of FIG. 9, a pseudorandom connection timing sequence that is unique to this pair of devices 100a,b is established. In step 910 of FIG. 9, each device 100 starts timing upon a timing synchronization event using the discovery transceiver 104. In step 912 of FIG. 9, the two devices disconnect.

As discussed herein, each device 100 develops and maintains a list of up to N devices 100 that they are paired/linked with. In an aspect of the present invention, an exemplary maximum number of paired/linked devices 100 is 12. Other quantities of paired devices 100 are also possible. Each device 100 maintains a list of paired or linked devices 100, with a particular ranging timing pattern and a device ID recorded for each of them. The pairing list with ranging timing pattern and device ID are stored in the database.

As illustrated in FIGS. 10 and 11, if a ranging attempt (between two devices 100a,b) is blocked by another ranging event, where one of the pair of devices 100a,b from the ranging attempt is already in the middle of a ranging event with a different device (e.g., device 100c). Each device 100 in the link will time out for that attempt and then retry at the next scheduled time in the predetermined pseudorandom sequence.

If the second device 100b is measured to be beyond a threshold distance from the first device 100a or has not had any successful ranging attempts for a particular duration of time, the second device 100b will be "forgotten" and removed from the list of linked or paired devices that are tracked and ranged by the first device 100a.

As discussed herein, a key factor in coordinating the ranging and discovery steps is the utilization of pseudorandom timing for both the ranging and discovery operations. Each controller 102 of each device 100 includes random number generation functionality (e.g., a random number generator). Each random number generator is also seeded with a unique key, e.g., a MAC address, such that each device 100 utilizes a unique pseudorandom interval. As discussed below, for ranging operations, each pair of devices 100a,b makes use of a unique seed value for the pair of devices 100a, b. For both discovery and ranging operations, one device 100 (e.g., a first device 100a) must be a beacon and transmitting with either its discovery transceiver 104 for discovery operations or with its ranging transceiver 106 for ranging operations, while the other device 100 (e.g., a second device 100b) needs to be receiving with either its discovery transceiver 104 for discovery operations or with its ranging transceiver 106 for ranging operations.

FIG. 10 is a timing diagram that illustrates the transmission and receiver operations during a discovery operation for a first device 100a and a second device 100b. As illustrated in FIG. 10, if both devices 100a,b are listening at a same point in time, there will be no discovery. Because of the pseudorandom nature of the discovery timing, there is a very low probability that two device 100a,b that were both in receive mode at one point in time will both be receiving simultaneously the next time/opportunity during discovery operations. According to a pseudorandom pattern, a device's discovery transceiver 104 will transmit a beacon pulse of a selected duration ($T_{TX}$) with a pseudorandom interval ($T_{BC}$) between beacon pulses with that pseudorandom interval $T_{BC}$ adjusting pseudorandomly. Note that each receive (RX) period is of a duration $T_{RX}$. The RX period ($T_{RX}$) may also be adjusted pseudorandomly.

FIG. 12 is a timing diagram illustrating the issues involved with managing the timing coordination for the ranging operation. FIG. 12 illustrates the ranging operation timing coordination for three devices 100a,b,c. Managing the timing coordination between groups of devices (such as presented in the device pairing scenarios of FIG. 2) can be difficult. These problems may be avoided by allowing each device pair (e.g., a first device 100a and a second device 100b) to track their timing (for ranging operations) independent of any other devices (e.g., a third device 100c). However, there may still be a risk of ranging time event collisions, such as between a first device pair 100a/100b, a second device pair 100a/100c, or a third device pair 100b/100c conflicting with any other of the device pairs. In an aspect of the present invention, the probability of a ranging conflict is reduced to a true random variable by setting the ranging interval time (TRI), by using a pseudorandom time interval (with limited min and max values) with a unique seed value for each pair of devices. The probability of a collision can be modeled as follows:

$$Pc = 1 - \left[1 - \frac{Tr}{Tri - Tr}\right]^{(N-1)},$$

where $P_C$ is the probability of collision for any event, and N is the number of devices in range (assuming uncorrelated connection intervals).

In an aspect of the present invention, illustrated in FIG. 12, the database 110 of a particular device 100 may be downloaded periodically to a database 1210 via a device scanner 1202 of a fixed base station 1201. The database 1210 may be a part of the fixed base station 1201 or an external database that is accessed remotely via a network or other similar communication. The data transfer between the device 100 and the device scanner 1202 may be via Bluetooth wireless communication, NFC wireless communication, other wireless communication systems, or direct-contact data communication. The centralized database 1210 and device scanner 1202 may be incorporated into a single device or may be separate devices. A device 100 may store several days of data in its local database 110. Therefore, devices may be linked to the device scanner 1202 on a periodic basis depending on how often the centralized database 1210 is to be updated with data (e.g., every day or once a week).

In one embodiment the device scanner 1202 of the fixed base station 1201 includes a transceiver that is functionally the same as the discovery transceiver 104 of the wireless device 100 described herein. In other words, the transceiver of the device scanner 1202 links/pairs with a discovery transceiver 104 of a wireless device 100 and begins the transfer of range/proximity data. See FIG. 8, which is discussed herein.

The server database 1210 may be configured to organize and store "contact tracing" reports for each individual (and their corresponding device 100 configured as a badge/tag). An exemplary contact tracing report may be specific to an individual's user ID and include a data range, the individual's name and user ID, and those other devices b-n that were within a selected threshold distance from the particular device 100a (e.g., within six (6) feet) during the selected data range. The contact tracing report may also indicate the duration of contact or an accumulated duration of contact. Such a contact tracing report would allow a report to be generated for a particular individual associated with device 100a and those individuals associated with the other devices 100b-n.

Thus, embodiments of the present invention provide for contact tracing solutions that provide ranging operations with centimeter accuracy but are low powered and with a reduced footprint, allowing them to be implemented as wearable badges or tags. Such solutions rely upon an intermittent use of a low power transmitter/receiver (e.g., Bluetooth radios) for discovery and linking functionality, and a UWB transmitter/receiver to provide the centimeter accuracy ranging functionality. Such badges/tags may be powered by light-weight batteries, such as button cells or similarly sized batteries.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A contact and ranging system comprising:
  a first device of a plurality of devices, the first device comprising:
    a first transceiver configured to perform discovery mode operations;
    a second transceiver configured to perform ranging mode operations, and
    a controller operable to control the operation of the first transceiver and the second transceiver;
  wherein the first device is operable to determine a distance between the first device and a second device of the plurality of devices.

2. The contact and ranging system of claim 1, wherein the controller is operable to selectively energize one of the first transceiver and the second transceiver for a selected transmission or reception operation, and wherein the first transceiver and the second transceiver are de-activated otherwise.

3. The contact and ranging system of claim 1, wherein the first device is operable to operate in a discovery mode, wherein during the discovery mode the first transceiver is operable to transmit a beacon radio signal and to listen for a reply from another device of the plurality of devices also operating in a discovery mode.

4. The contact and ranging system of claim 3, wherein the controller is operable to direct the first transceiver to perform a linking/pairing operation with the another device when a reply radio signal is received from the another device, wherein the another device is the second device.

5. The contact and ranging system of claim 4 further comprising a database, wherein the linking/pairing operation includes an exchange of user IDs and the selection of a ranging schedule for the first and second devices, and wherein controller is operable to store the user IDs and ranging schedules in the database.

6. The contact and ranging system of claim 1, wherein the first transceiver is one of a radio frequency transceiver, an ultrasonic transceiver, and an infrared transceiver, and wherein the first transceiver is a low-powered transceiver, as compared to the second transceiver.

7. The contact and ranging system of claim 6, wherein the radio frequency transceiver is a Bluetooth wireless transceiver, and wherein the Bluetooth wireless transceiver is operating in a Bluetooth Low Energy (BLE) mode.

8. The contact and ranging system of claim 1, wherein the controller is operable to direct the second transceiver to perform a ranging operation with the second device according to a ranging schedule, wherein the second transceiver is configured to transmit a ranging radio signal, wherein the second transceiver is configured to receive a ranging radio signal from the second device, wherein the controller is operable to perform a time of flight calculation to determine a device-to-device distance that is based upon an elapsed time for one of the first and second devices to transmit a ranging radio signal to be received by the other of the first and second devices, and for the other of the first and second devices to transmit a response transmission back to the one of the first and second devices.

9. The contact and ranging system of claim 8, wherein one of the first and second devices determines the device-to-device distance and communicates that distance back to the other of the first and second devices.

10. The contact and ranging system of claim 1, wherein the second transceiver is one of a radio frequency transceiver, an ultrasonic transceiver, an infrared transceiver, and a magnetic field transceiver, and wherein the second transceiver is configured to provide the device-to-device range with centimeter accuracy.

11. The contact and ranging system of claim 10, wherein the radio frequency transceiver is an ultra-wideband (UWB) transceiver.

12. The contact ranging system of claim 10, wherein the magnetic field transceiver comprises a transmitter configured to generate a magnetic field with a predetermined magnetic field strength, and further comprising a receiver configured to detect and measure a magnetic field strength of a magnetic field generated by the second device, and wherein the device-to-device range between the first device and the second device is based upon the measured field strength of the magnetic field generated by either the first device or the second device.

13. The contact and ranging system of claim 8 further comprising a database, wherein the controller is operable to store the device-to-device distance measurement in the database, and wherein the controller is further operable to store a corresponding timestamp for the distance measurement is also stored in the database.

14. The contact and ranging system of claim 1 further comprising a device scanner and a centralized database, wherein the device scanner is configured to communicatively couple to the first device and to download the user ID and ranging data stored in the first device's database, wherein the centralized database is operable to determine a contact tracing diagram defined by an accumulated quantity of time that the second device was within a threshold distance from the first device, and wherein the accumulated quantity of time is based upon the stored timestamps connected with each distance measurement.

15. A method for performing a contact and ranging operation between pairs of devices, the method comprising:
periodically placing a first transceiver of a first device of a plurality of devices in a discovery mode of operation, wherein the first transceiver transmits a beacon signal during the discovery mode and the first transceiver alternatively listens for a beacon signal transmitted by another device;
linking the first device to the another device of the plurality of devices when a beacon signal is received from the another device or the beacon signal transmitted by the first transceiver is received by the another device, wherein a corresponding user ID of the another device and a ranging schedule is stored in a database of the first device;
periodically placing a second transceiver of the first device in a ranging mode of operation, wherein the second transceiver transmits a ranging radio signal during the ranging mode and the second transceiver alternatively listens for a ranging signal from a second device, and
determining a device-to-device range between the first device and the second device, wherein the device-to-device range is based upon an elapsed time for one of the first and second devices to transmit a ranging radio signal to be received by the other of the first and second devices and for the other of the first and second devices to transmit a response transmission back to the one of the first and second devices.

16. The method of claim 15, wherein the first transceiver is only energized during the discovery and linking modes, and wherein the second transceiver is only energized during the ranging operation.

17. The method of claim 15, wherein the first transceiver is one of a radio frequency transceiver, an ultrasonic transceiver, and an infrared transceiver, and wherein the first transceiver is a low-power transceiver, as compared to the second transceiver.

18. The method of claim 17, wherein the radio frequency transceiver is a Bluetooth wireless transceiver, and wherein the Bluetooth wireless transceiver is operating in a Bluetooth Low Energy (BLE) mode.

19. The method of claim 15, wherein the second transceiver is one of a radio frequency transceiver, an ultrasonic transceiver, an infrared transceiver, and a magnetic field transceiver, and wherein the second transceiver provides the device-to-device range with centimeter accuracy.

20. The method of claim 19, wherein the radio frequency transceiver is an ultra-wideband (UWB) transceiver.

21. The method of claim 19, wherein the magnetic field transceiver comprises a transmitter configured to generate a magnetic field with a predetermined magnetic field strength, and further comprising a receiver configured to detect and measure a magnetic field strength of a magnetic field generated by the second device, and wherein the device-to-device range between the first device and the second device is based upon the measured field strength of the magnetic field generated by either the first device or the second device.

22. The method of claim 15 further comprising storing the device-to-device distance in a database of the first device and storing a corresponding timestamp for the distance measurement in the database.

23. The method of claim 22 further comprising communicatively coupling the first device to a device scanner and downloading the user IDs and ranging data stored in the first device's database.

24. The method of claim 23 further comprising determining a contact tracing diagram defined by an accumulated quantity of time that the second device was within a threshold distance from the first device, wherein the accumulated quantity of time is based upon the stored timestamps connected with each distance measurement.

25. A contact and ranging system comprising:
a first device of a plurality of devices, the first device comprising:
an electronic memory configured to store proximity records;
a unique identification, wherein the unique identification is stored in the electronic memory and is associated with each proximity record;
a ranging module operable to determine a distance to at least one other device of the plurality of devices, wherein a record of the distance to the another device is stored as a proximity record;
a data linking module configured to transmit proximity records to a fixed base station; and
a controller operable to control the operation of the ranging module and the data linking module, wherein the controller is operable to selectively energize one of the data linking module or the ranging module for a selected operation, and wherein the data linking module and the ranging module are de-energized otherwise.

26. The contact and ranging system of claim 25 further comprising the fixed base station comprising a centralized database configured for storing proximity records, wherein the data linking module is configured to automatically transmit the proximity records to the fixed base station, and wherein the data linking module is configured to transmit the proximity records to the fixed based station when commanded by the fixed base station.

27. The contact and ranging system of claim 25, wherein the data linking module is one of: a radio signal transceiver, an ultrasonic transceiver, and an infrared transceiver.

28. The contact and ranging system of claim 25, wherein the data linking module is configured for discovery mode operation, wherein during the discovery mode the data linking module is operable to transmit a beacon signal and to listen for a reply from another device of the plurality of devices also operating in a discovery mode.

29. The contact and ranging system of claim 28, wherein the controller is operable to direct the data linking module to perform a linking/pairing operation with the another device when a reply radio signal is received from the another device.

30. The contact and ranging system of claim 29 further comprising a database stored in the electronic memory, wherein the linking/pairing operation includes an exchange of user IDs and the selection of a ranging schedule for the paired devices, and wherein the controller is operable to store the user IDs and the ranging schedules in the database.

31. The contact and ranging system of claim 25, wherein the ranging module comprises one of: a radio signal transceiver, an ultrasonic transceiver, an infrared transceiver, and a magnetic field transceiver.

32. The contact and ranging system of claim 31, wherein the magnetic field transceiver comprises a transmitter configured to generate a magnetic field, and further comprising a receiver configured to detect and measure a magnetic field strength of a magnetic field generated by the another device.

33. The contact and ranging system of claim 31, wherein the ranging module is configured to perform a ranging mode operation, and wherein the controller is operable to determine a device-to-device range to the another device as defined by a time-of-flight calculation when the ranging module is one of the radio signal transceiver, the ultrasonic transceiver, and the infrared transceiver.

34. The contact and ranging system of claim 33, wherein the controller is operable to determine a device-to-device range to the another device as defined by a measured field strength of a magnetic field generated by the another device when the ranging module is a magnetic field transceiver.

35. The contact and ranging system of claim 31, wherein the ranging module is configured to provide ranging with centimeter accuracy, and wherein each ranging record comprises a corresponding timestamp for when the particular ranging operation is performed.

36. The contact and ranging system of claim 35 further comprising the fixed base station comprising a centralized database configured for storing proximity records, wherein the centralized database is operable to determine a contact tracing diagram defined by an accumulated quantity of time that the another device was within a threshold distance from the first device, and wherein the accumulated quantity of time is based upon the stored timestamps connected with each distance measurement.

* * * * *